Patented Oct. 4, 1932

1,881,227

UNITED STATES PATENT OFFICE

EDUARD ORNO-ORNFELDT, OF BERLIN-CHARLOTTENBURG, AND MAKOTO LOEW, OF BERLIN, GERMANY

METHOD OF IMPROVING SOUTH AMERICAN MATÉ

No Drawing. Application filed June 16, 1930, Serial No. 461,622, and in Germany December 19, 1928.

This invention relates to beverages, and more especially to the beverages known as maté. It is an object of our invention to provide means for improving the taste and odour of maté so as to render it more palatable.

In some South American countries a tree is found, the scientific name of which is *Ilex paraguayensis*, and the dried leaves of which are used to prepare the well known maté or Paraguay tea. This tea resembles Chinese or Indian tea in as far as it exerts a very stimulating effect and also contains a certain quantity of theine.

Unfortunately the taste and smell of maté, which greatly resemble those of medicinal teas, have hitherto rendered it impossible to introduce the maté for general use in North America and in Europe.

We have found means for improving the taste and odour of maté to the extent of rendering it palatable to everybody.

It is well known that the taste of tea, coffee and similar substances can be substantially improved by treating them with ethereal oils. Our invention is based upon the discovery that not all ethereal oils are suitable for this purpose, and that only the primary products of oxidation of alcohols, i. e. the aldehydes and ketones either natural or synthetic, can be effectively used for improving the taste and smell of the said products.

The aldehydes and ketones are distinguished by their labile and very reactive, bivalent carbonyl radical =C=O which is combined in the aldehydes with a hydrogen atom,

whereas in the ketones the hydrogen atom is replaced by a hydrocarbon radical, as, for instance, in the compound

The efficiency of the aldehydes and ketones is due to the ready action they exercise upon labile hydrogen atoms, whether they are bound to nitrogen or carbon, whereby either water is split off or the alcohol radical =CH:OH is formed. For instance, an aldehyde ammonia addition product, such as $CH_3-CH(OH)(NH_2)$, is formed from an aldehyde and ammonia or an amine. Similarly, croton aldehyde or aldol is formed from two molecules of acetaldehyde. Thus a compound having a disagreeable taste and smell may be changed to such a degree that the taste and smell are either completely eliminated or their nature is thoroughly altered.

When treating maté with an ethereal oil not containing an aldehyde or ketone, as, for instance, with wintergreen oil on the one hand, and with a pure aldehyde or ketone, as ethyl aldehyde or acetone, on the other hand, it appears that the tasting and smelling substances have remained practically unchanged by wintergreen oil, whereas ethyl aldehyde and acetone have a quite surprising effect. The same favourable result is obtained by employing ethereal oils containing aldehydes or ketones.

The reagents may be employed in the form of aqueous solutions or suspensions or, if desired, in the form of vapours.

The action of the aldehydes and ketones is increased by heating.

The stimulating theine content of maté is not lessened by treating the product with aldehydes or ketones according to the present invention, nor does any other alteration of the physiological effects, or reduction of the contents of maté take place by extraction.

For instance, for carrying out our invention, we may proceed as follows:—

Commercial maté is intimately mixed with 1.5 parts by weight of 1% aqueous ethyl aldehyde solution, and the whole is heated in a closed vessel to about 100° C. Thereupon the product is dried.

Various changes may be made in the details disclosed in the foregoing specification without departing from the invention or sacrificing the advantages thereof.

In the claims affixed to this specification no selection of any particular modification of the invention is intended to the exclusion of other modifications thereof and the right to subsequently make claim to any modification not covered by these claims is expressly reserved.

We claim:—

1. The method of improving the taste and smell of maté, comprising treating the maté leaves with a chemical substance containing a primary oxidation product of an alcohol.

2. The method of improving the taste and smell of maté, comprising treating the maté leaves with a chemical substance containing an aldehyde.

3. The method of improving the taste and smell of maté, comprising treating the maté leaves with a chemical substance containing a ketone.

4. The method of improving the taste and smell of maté, comprising treating the maté leaves with an etheral oil containing a primary oxidation product of an alcohol.

5. The method of improving the taste and smell of maté, comprising treating the maté leaves with an ethereal oil containing an aldehyde.

6. The method of improving the taste and smell of maté, comprising treating the maté leaves with an ethereal oil containing a ketone.

In testimony whereof we affix our signatures.

EDUARD ORNO-ORNFELDT.
MAKOTO LOEW.